United States Patent [19]

Leib et al.

[11] Patent Number: 5,107,351
[45] Date of Patent: Apr. 21, 1992

[54] IMAGE ENHANCED OPTICAL CORRELATOR SYSTEM

[75] Inventors: Kenneth G. Leib, Wantagh; Benjamin J. Pernick, Forest Hills, both of N.Y.

[73] Assignee: Grumman Aerospace Corporation, Bethpage, N.Y.

[21] Appl. No.: 481,446

[22] Filed: Feb. 16, 1990

[51] Int. Cl.⁵ .......................... G02B 5/30; G02B 27/46
[52] U.S. Cl. ......................... 359/11; 359/19; 359/29; 359/66; 359/256; 359/561; 382/31; 382/42
[58] Field of Search ...................... 350/3.6, 3.68, 3.72, 350/3.82, 374, 400, 401, 402, 403, 162.12, 162.13; 382/31, 42

[56] References Cited

U.S. PATENT DOCUMENTS

| | | |
|---|---|---|
| H331 | 9/1987 | Gregory et al. ............... 350/162.13 |
| 3,398,269 | 8/1968 | Williams . |
| 3,697,757 | 10/1972 | Stone . |
| 3,773,401 | 11/1973 | Douklias et al. . |
| 3,779,631 | 12/1973 | Shupe . |
| 3,829,832 | 8/1974 | Kawasaki . |
| 4,084,255 | 4/1978 | Cassasent et al. . |
| 4,111,526 | 9/1978 | Joseph . |
| 4,118,107 | 10/1978 | Parrent, Jr. et al. . |
| 4,118,685 | 10/1978 | Simpson . |
| 4,153,335 | 5/1979 | Buchan . |
| 4,158,502 | 6/1979 | Greiner et al. . |
| 4,158,503 | 6/1979 | Balasubramanian . |
| 4,174,179 | 11/1979 | Tschudi et al. . |
| 4,209,780 | 6/1980 | Fenimore et al. . |
| 4,277,137 | 7/1981 | Upatnieks et al. . |
| 4,383,734 | 5/1983 | Huignard et al. . |
| 4,389,092 | 6/1983 | Tamura . |
| 4,389,093 | 6/1983 | Jackson . |
| 4,462,046 | 7/1984 | Spight . |
| 4,490,849 | 12/1984 | Grumet et al. . |
| 4,511,219 | 4/1985 | Giles et al. ......................... 350/403 |
| 4,514,038 | 4/1985 | Pichon et al. . |
| 4,539,651 | 9/1985 | Ludman . |
| 4,588,260 | 5/1986 | Horner . |
| 4,628,473 | 12/1986 | Weaver .......................... 350/162.13 |
| 4,637,056 | 1/1987 | Sherman et al. ................ 350/162.13 |

OTHER PUBLICATIONS

Almeida et al; "Pattern Recognition of Biological Specimens Via Matched Spatsal Filtering"; Journal of Applied Photographic Engineering, vol. 4, No. 1, 1978, pp. 28–30.

Demoli et al.; "Discrimination Sensitivity of the Extended Optical Correlator," Optics Communications, vol. 64, No. 5, Dec. 1987.

Primary Examiner—Bruce Y. Arnold
Assistant Examiner—R. D. Shafer
Attorney, Agent, or Firm—Scully, Scott, Murphy & Presser

[57] ABSTRACT

An image enhanced optical correlator system providing for optical preprocessing of an input image prior to processing thereof in an optical correlator. The optical preprocessing is provided to enhance the image and/or image related characteristics such that the probability of detection of prescribed targets therein in the optical correlator is increased. In the system, an input image beam is split into orthogonally polarized image inputs, processed to enhance targets therein, and then the algebraic result (addition and/or subtraction) thereof is processed through an optical correlator. Techniques are used in the feedback systems to enhance the output plane correlation signal detection by an adjustment in phase, spatial frequency filtering and/or threshold setting optimization.

11 Claims, 6 Drawing Sheets

IMAGE ENHANCED OPTICAL CORRELATOR SYSTEM

BACKGROUND OF THE INVENTION

1. Field of the Invention

The present invention relates generally to an image enhanced optical correlator system, and more particularly pertains to an optical system in which an input image is optically preprocessed according to its polarization properties prior to processing thereof in an optical correlator. The subject invention depends upon the property of a target to reflect radiation with different polarization characteristics. The image enhancing techniques taught by the present invention can be applied to radar, visual, infrared and other developed images.

2. Discussion of the Prior Art

Prior art techniques are available for preprocessing, eliminating, enhancing and otherwise preparing an image for further processing, but these are predominantly all digital computer processing techniques.

One known prior art processing technique uses two separate input images (e.g. photos taken at two different times), and optically processes the separate input images for differences therein. However, this processing technique is quite different from the polarized processing of a single input image as taught by the present invention.

SUMMARY OF THE INVENTION

Accordingly, it is a primary object of the present invention to provide for optical preprocessing of an input image prior to processing thereof in an optical correlator. The optical preprocessing is provided to enhance the image such that the probability of detection of prescribed targets therein in the optical correlator is increased.

A further object of the subject invention is the provision of an optical preprocessing arrangement which is compact, self contained, and which provides processing in real time at an almost instantaneous rate. Such an approach should find applications in areas where a small processing unit is desirable, such as in airborne systems or satellite systems.

In accordance with the teachings of a preferred embodiment herein, the present invention provides an image enhanced optical correlation system in which an input image beam of interest is split into first and second image beams, each having an orthogonally different polarization component. The splitting of an image into orthogonally different polarization components recognizes that light reflected from many man made objects often has a strong polarization component in a given direction (i.e. it is not randomly polarized), and therefore the image will be much more identifiable and detectable in one of the orthogonal polarization components than in the other. A spatial light modulator is provided for each of the first and second image beams and modulates a polarized coherent laser beam with the image information. A polarization rotator is provided for one of the polarized image beams from the spatial light modulator to adjust the polarization thereof to be coplanar with that of the second image beam. The first and second coplanar polarized image beams are then recombined in a beam splitter.

The recombined beam is then processed in a matched filter optical correlator system, in which the recombined beam is directed onto a multiple holographic lens which forms multiple replicated images of the recombined beam which are directed onto a corresponding multiple matched filter. Such matched filter optical correlator systems are well known in the art, and are exemplified by U.S. Pat. No. 3,779,492 for Automatic Target Recognition System, and by Aerial Reconnaissance Film Screening Using Optical Matched Filter Image - Correlator Technology, Applied Optics, Vol. 17, No. 18, Sep. 15, 1978. At least one inverse transform lens has the outputs of the multiple matched filter incident thereon, and at least one photodetector detects the output of the inverse transform lens in the correlation output plane of the optical correlator.

Moreover, in a preferred embodiment a driven phase modulator has one of the laser image beams incident thereon for varying its phase relative to that of the second image beam to achieve an optimum phase relationship. Additionally, a spatial filter has the recombined beam incident thereon for spatially filtering the recombined beam. In one preferred embodiment, the spatial filter is electrically controlled to control the spatial filtering characteristics thereof. In another preferred embodiment the laser source is an active source, the output of which is directed onto a polarization controller, which is controlled by the detector in the output plane of the optical correlator to maximize the detector output signal.

Moreover, a compound matched filter can have the output beam incident thereon, and is electrically controlled to control the spatial filtering characteristics thereof. In a preferred embodiment, the compound matched filter comprises a liquid crystal matched filter having the filtering characteristics of different areas thereof, such as concentric annular rings, controlled by different electrical control signals.

BRIEF DESCRIPTION OF THE DRAWINGS

The foregoing objects and advantages of the present invention for an image enhanced optical correlator system may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
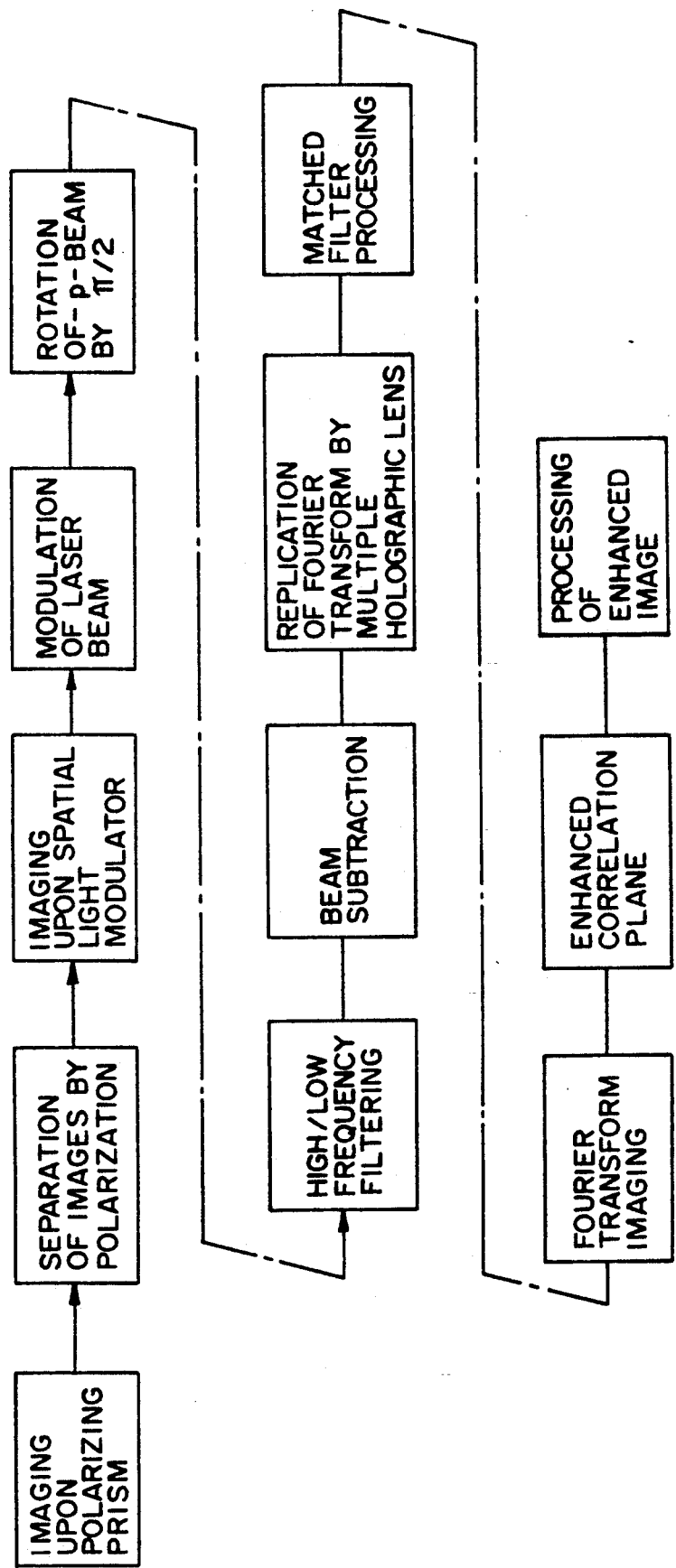
FIG. 1 is a schematic block diagram of the major functions and components of the present invention.

Referring to the drawings in detail, FIG. 1 illustrates a schematic block diagram of the major functions and components of the present invention. Referring thereto, an input image is directed through a polarizing prism which separates it into two polarized p and s images, each of which is imaged onto a spatial light modulator for modulation of a laser beam therewith. The polarization of one beam, either the p or s beam, is then rotated by $\pi/2$ to make the polarizations coplanar, after which the beams can be filtered as by spatial frequency filters. The two coplanar polarized beams are then recombined interferometrically by either subtraction or addition thereof, and the combined beam is then replicated and Fourier transformed by a multiple holographic lens. Each of the replicated beams is focused by the multiple holographic lens onto a matched filter. The optical output thereof is Fourier transformed again, as by a lens, which focuses it onto an enhanced correlation plane, and the enhanced image therein is then detected and processed.

The system of the present invention can also be augmented, such as by active illumination of a target or scene by an active illumination source used in association therewith to provide for controlled illumination and optimization of the detection function.

Figure 2:
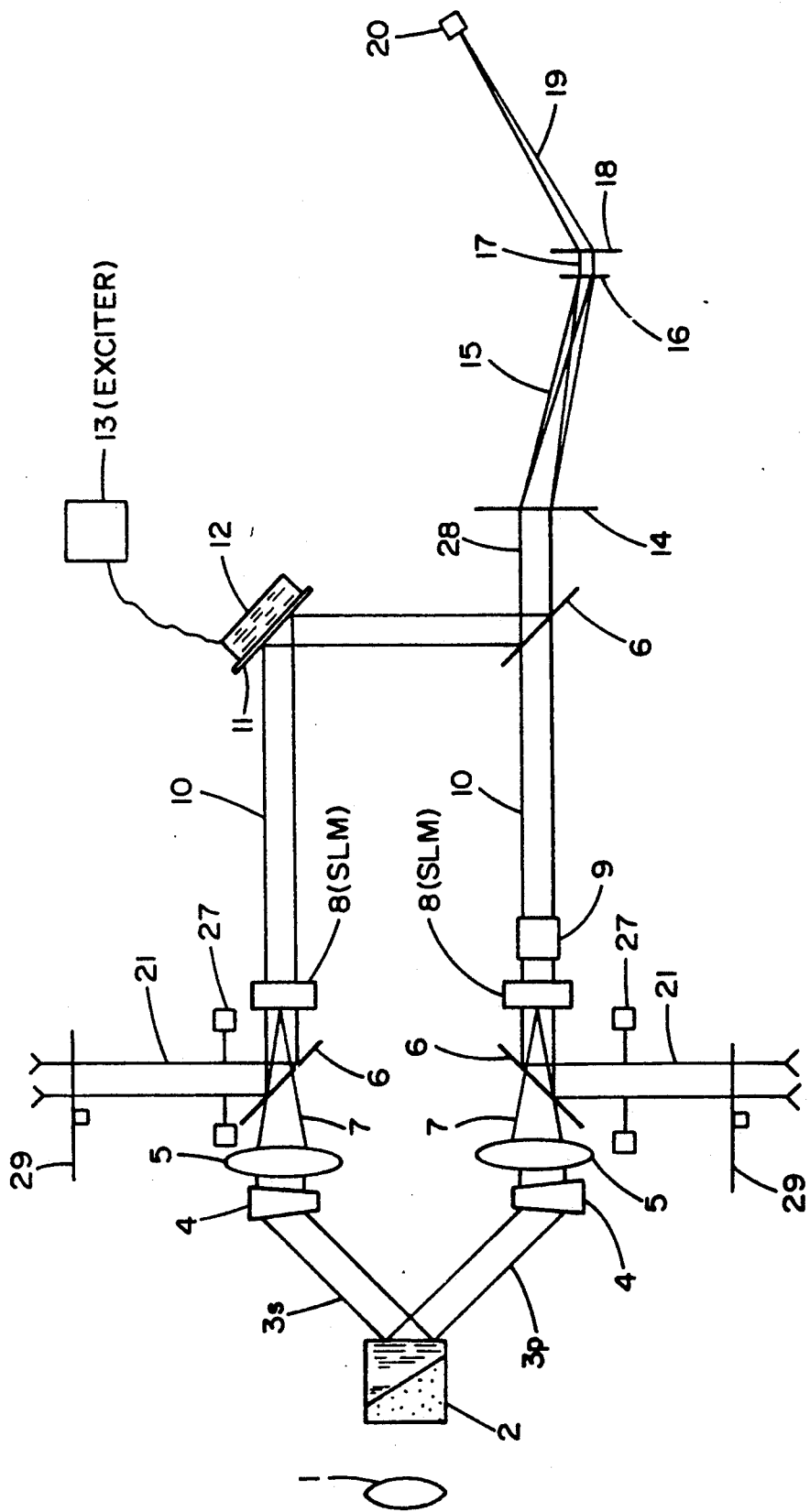
FIG. 2 illustrates a schematic arrangement of one preferred embodiment of the subject invention.

Referring now to the schematic arrangement of FIG. 2, an object such as a terrain area is imaged by an optical system 1 through a polarization separator element such as a Wollaston prism 2 onto two spatial light modulators (SLM) 8. The prism 2 splits the light of the incoming image into two orthogonal polarization components, referred to as s-polarization 3s and p-polarization 3p. Optical wedges 4 are used to align the two resultant image beams in parallel. Each lens 5 is a generic lens which focuses the incoming image in a beam 7 upon the SLM 8 through a beam splitter 6. The latter are designed to permit the incoming image radiation to pass to the SLM 8, and also to reflect a collimated laser light beam 21 towards the SLM 8. Elements 27 and 29 are shutters and neutral density filters respectively, and are used to control the amplitude and presence or not of the two unmodulated laser beams 21. The SLM 8 is a device upon which an image can be recorded at a set of wavelengths, and enables the recorded image to modulate the laser beam 10 transmitted through the SLM 8 which is selected to be at an appropriate wavelength. The output of both SLMs 8 is a pair of orthogonally polarized beams 10 spatially modulated by the SLMs. In order to interfere algebraically (in amplitude), the two beams require coplanar polarization. Thus, an optical rotator 9 is needed, which could be leavo- or dextro-rotary (i.e. left or right rotating) crystalline quartz. The rotation of the plane of polarization thereof is defined by $$Q = \frac{\pi d}{\lambda_o}(n_l - n_d)$$

where d is the distance traversed, $\lambda_0$ is the wavelength in vacuo and n the component indices of refraction. For example, for right hand x-quartz, $(n_l - n_d) = 7.10 \times 10^{-5}$ so that at a sodium light wavelength (5893 Å), a crystal 4.15 mm long yields an appropriate rotation, which indicates that reasonable thicknesses are usable. Some SLMs require polarization analyzers for readout which is elaborated upon hereinbelow. However, if the two beams are treated similarly (but not identically since they are orthogonally polarized), one beam must be rotated relative to the other to make them coplanar.

The coplanar beams 10 are then recombined at a beam splitter 6. The s-polarization component is reflected by a mirror 11 prior to recombination at the beam splitter 6. A piezoelectric driver 12 is attached to the mirror 11. The piezoelectric crystal, when driven by an exciter 13 at an appropriate voltage, changes its thickness dimension, the effect of which is to drive the mirror 11 along an axis perpendicular to its mirrored surface. Control of the amount of movement is important to enable the combined beams to be phased properly to achieve algebraic subtraction or addition.

Figure 4A:
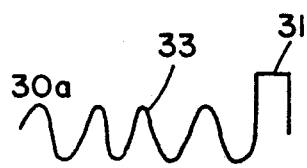
FIG. 4a-b presents a set of waveforms which are useful in explaining the principles of operation of the subject invention.
Figure 4A:
Figure 4A:
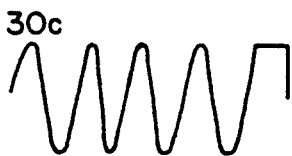

Consider the exemplary waveforms of FIG. 4a Suppose the s-beam is represented by the wave 30a, which could be one line through the beam. A man made target 31 is shown in a background 33. The p-beam is shown at 30b without a man-made target. Algebraically combining these two beams results in the beam 30c. Clearly, the background is comparable to the target, making the latter difficult to distinguish even with the process of thresholding.

Figure 4B:
Figure 4B:
Figure 4B:

Now consider the wave 32a, identical to 30a, with the man-made target 31 seen at the right end. Suppose now the piezoelectric driver is activated to change the optical path of the s-beam, and assume in particular that the wave path is retarded by one half wave, $\lambda/2$. The result is shown at 32b in FIG. 4b. Combining these algebraically produces the wave 32c. The man made target now stands out clearly, and while the target size has not changed, it does stand out with less background. In actual practice, neither wave will be exactly symmetrical as shown, but the system will provide an enhancement to the image.

Referring to FIG. 2, the recombined beam 28 is directed onto a multiple holographic lens 14 which forms a replication of the Fourier Transform of the image and directs each replicated image onto a corresponding multiple matched filter 16. The outputs 17 of all of the matched filters 16 are transformed again (inversely transformed) by an appropriate lens 18, which can also be a holographic lens, and is directed thereby in a beam 19 to a detection device 20, which can be a scanning photometer, television camera (without lens), or other imaging detector.

When a scanning photometer and its associated fiber optic probe is used as the detector device 20, it and the piezoelectric controller 13 for the mirror 12 can be connected in a feedback loop. Then the mirror 12 can be controlled to maximize the autocorrelation function. This takes an otherwise open loop system, and closes the loop for optimized image enhancement.

Figure 6:
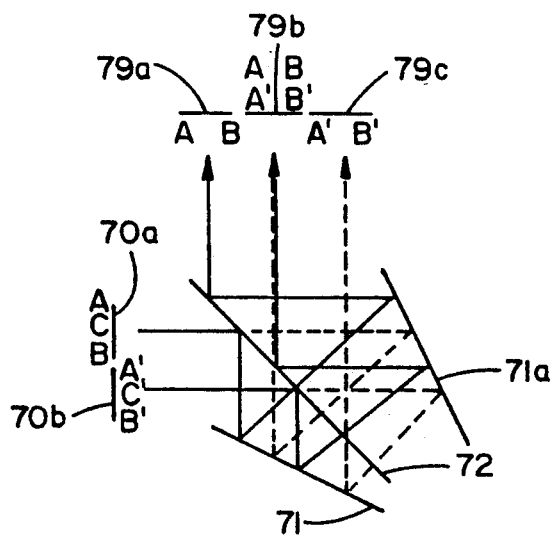
FIG. 6 illustrates the operation of a triangular interferometer arranged to form the algebraic sum of two input images.

FIG. 2 illustrates a general arrangement of an interferometer in which the two beams 10 are interferometrically combined to form beam 28. FIG. 6 illustrates a particular embodiment of a triangular interferometer in which two input images 70a, 70b are directed onto a beam splitter 72 which splits the image into a component reflected to a mirror 71 and a component transmitted to a mirror 71a. The transmitted center line ray of image 70a can be seen to combine with the reflected center line ray of image 70b as overlapped images 79b. Tracing the outer rays of the images 70a, 70b, they form three images 79a, 79b and 79c with corresponding edges A and B, and $A^1$ and $B^1$. Note the overlapping edge correspondence in the image 79b. It is important that this relationship be observed if two almost similar images are to be algebraically added or subtracted to enhance an image.

If images 70a, 70b are representative of the images in FIG. 2, then the algebraic sum 79b in FIG. 6 would be incident upon the multiple holographic lens 14 in FIG. 2 for subsequent processing. Thus, the prior art triangular interferometer of FIG. 6 can be incorporated as an alternate element in a modified embodiment of the subject invention. Other different types of interferometers can also be used in other embodiments of the present invention.

FIG. 3 illustrates an additional feature which could be employed with the subject invention, namely spatial filtering of the combined beams 28 prior to Fourier transformation thereof. A spatial filter system consisting of an objective lens 22, a spatial filter 23 or 24, and a collimating lens 25 can eliminate an upper, lower or a particular pass band of spatial frequencies, thereby rendering particular targets of interest in the input image more detectable.

Figure 3A:
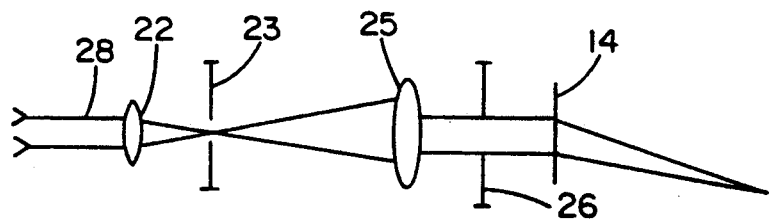
FIG. 3a-b illustrates a spatial filtering technique which could be utilized in association with a system of the present invention.

Spatial filter 23 illustrates a low pass filter which allows only frequencies below those determined by the aperture therein to pass through the filter. Those spatial frequencies are determined by the relationship $$S = (\lambda F)^{-1} \frac{\text{cycles/mm}}{\text{mm}}$$

where $\lambda, F$ are the wavelength, lens 22 focal length, and S is the spatial frequency sensitivity. For example, if $\lambda = 6238$ Å and $F = 3$ mm, $S = 527$ cycles/mm/mm. Now, if the filter aperture 23 in FIG. 3(a) is 10 micrometers, only frequencies below 5.3 cycles/mm will be allowed to pass; others above that are blocked. The lens 25 then collimates the beam without the higher frequencies for Fourier transformation.

If a pass band of spatial frequencies is desired, a central block provided by a spatial filter element 26 could be provided, for example of 3.8 $\mu$ meters, and no frequency below 2 cycles/mm will pass therethrough. If this is combined with an aperture (as above) of 10 micrometers, a pass band is achieved of 2-5.3 cycles/mm, which is transmitted for further optical processing.

Figure 3B:
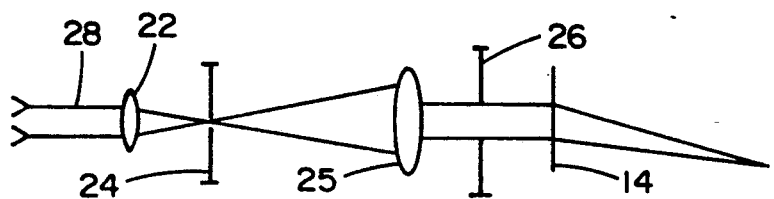

If it is desired to provide spatial filtering (as in FIG. 3b, of one or both of the beams 10, the filter elements 22, 23 or 24 and 25 could be located between either or both SLMs 8 and the recombining beam splitter 6 in FIG. 2. Since the objective lens 22 may be generally small, the beams 10 would have to be reduced in diameter by techniques well known in the optics field.

Figure 5:
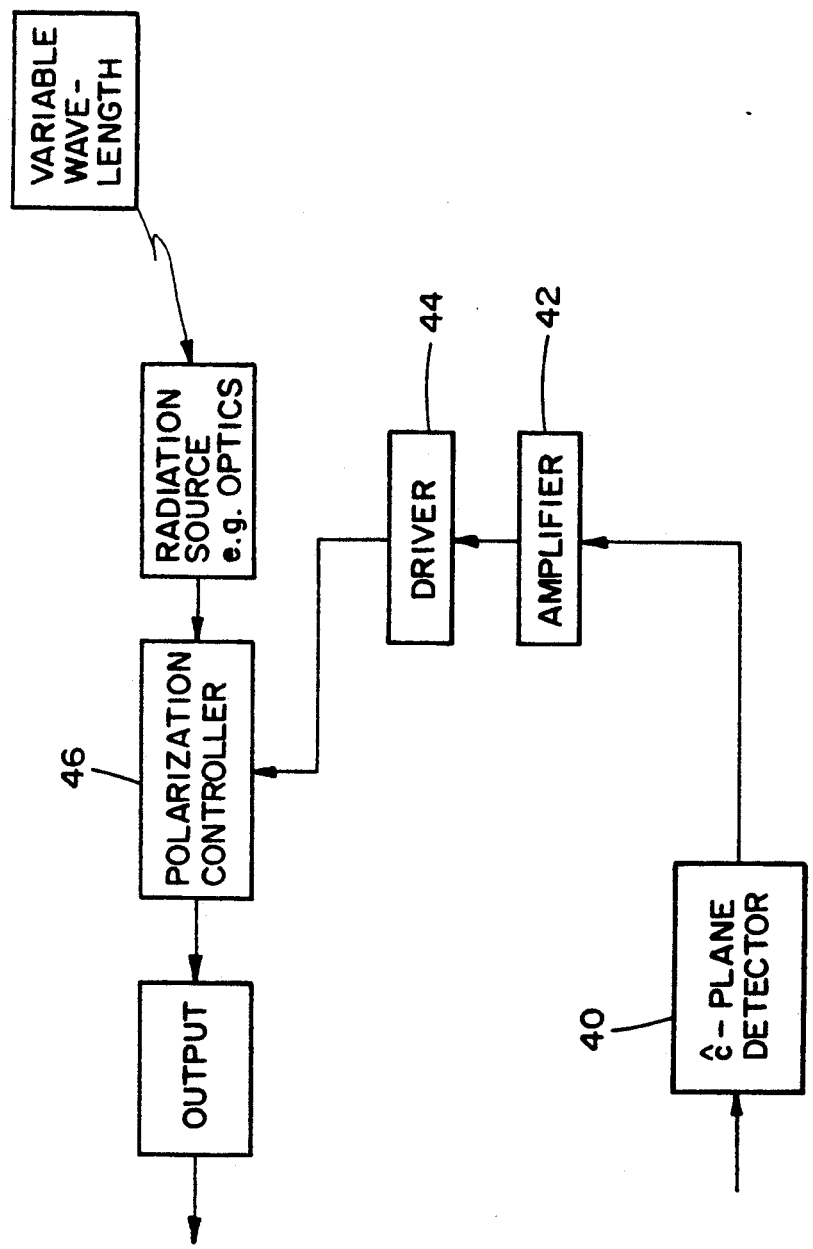
FIG. 5 illustrates an actively controlled radiation source which could be utilized in association with a system of the present invention.

FIG. 5 illustrates one embodiment of the subject invention employing an active radiation source to illuminate a scene with a prescribed state of polarization and a prescribed wavelength. Control of these parameters would provide an enhancement to the passive system of FIG. 1, and also enables optimum radiation conditions to be established for the system of FIG. 1. It should be recognized that ambient conditions may not necessarily be conducive to the most effective system performance, hence an active source is optimum.

When the system is operated in a closed loop mode, the photometer probe 40 is placed on top of the correlation signal c. The output thereof is then amplified by an amplifier 42 which can be integral to the photomultiplier and which receives the signal from the fiber optic probe of the photometer. The output signal is then fed through a driver 44 to a polarization controller 46. The driver 44 is a controlled power supply, the design of which is well known and explicitly depends upon the type of controller being utilized.

The polarization controller 46 can be a birefringent crystal which can have its index ellipsoid (distribution of the index of refraction in the birefringent crystal material) redistributed by the application of an electric field. This is done in conjunction with a polarizer. By establishing a rotating field, the plane of polarization can be rotated.

Alternatively, a circularly polarized laser can be followed by a linear polarizer. Rotating a linear polarizer in this arrangement rotates the plane of polarization. However, the first described technique is preferred because it can rotate the plane of polarization with less loss of laser light. Rotating a linear polarizer with a circularly polarized laser has an inherent 3 db light loss.

Both techniques described hereinabove are wavelength dependent. With a fixed wavelength, these devices can be designed appropriately once the index of refraction is known as a function of wavelength.

In some cases it may be desirable to vary the wavelength to achieve enhancement of the image because of the improved reflectance at a given wavelength, and then the laser source is controlled accordingly. This process is described in detail in U.S. Pat. No. 4,250,465.

In general, those elements of the system which must respond or transmit at more than one fixed wavelength must be designed with considerable care as both glass and crystalline materials are quite wavelength dependent. Thus, a preferred system uses one wavelength for illumination.

FIG. 3 illustrates the use of spatial frequency filtering, which has been described as being possibly applicable at several optional points in the system of FIG. 2. However, each of the filters illustrated in FIG. 3 is fixed in nature and cannot be varied. The frequencies passed by the aperture, FIG. 3(a), are determined from the system constant, S where $S = (\lambda F)^* (-1)$ cycles/mm/mm. Thus, if $\lambda = 6328$ angstroms and $F = 3$ mm, a common objective lens focal length, $S = 527$ cycles/mm/mm. A 10 $\mu$meter aperture would then pass spatial frequencies up to 2.64 cycles/mm, and higher frequencies would be obstructed from passing through the aperture.

Figure 8:
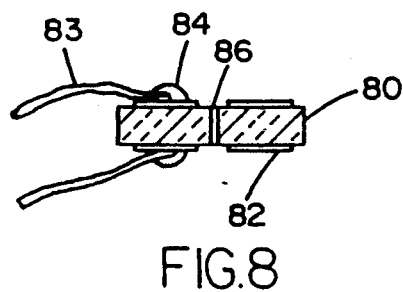
FIG. 8 is a sectional view through the spatial frequency filter of FIG. 7.
Figure 7:
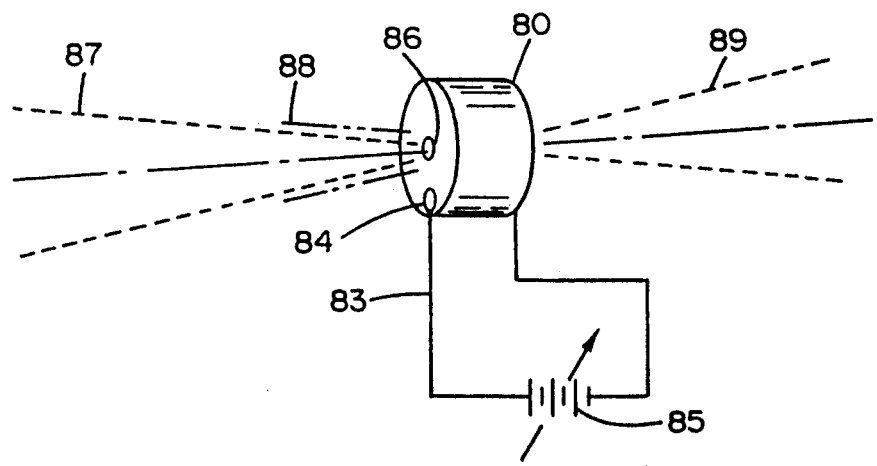
FIG. 7 shows one illustrative embodiment of an active controlled spatial frequency filter.

There may be situations in which a different spatial frequency cutoff is desired, which can be achieved by changing the spatial frequency filter, but this could be a laborious process since it involves an extensive alignment procedure after replacement of the filter. FIGS. 7 and 8 illustrate a simple construction of one embodiment of a variable spatial frequency filter which allows the aperture to be changed in diameter.

Referring to FIGS. 7 and 8, a piezoelectric crystal 80 has ring electrodes 82 secured intimately to its opposite surfaces. The ring electrodes 82 can be applied by vapor deposition of a conductor such as silver. Conducting wires 83 are attached to the ring electrodes with a low melting point solder 84 or with a conducting epoxy cement. The solder could be a cerrolow or cerrotru material, which are low melting point indium alloys. Spatial frequency filtering is achieved by drilling an appropriate diameter hole 86 in the piezoelectric crystal. Each ring electrode is shown as spaced from the aperture hole, but there seems to be no restriction on its coverage except that it should not interfere with the aperture hole. Since the aperture hole is typically several micrometers in diameter, it cannot be drilled by ordinary means, and an ultrasonic or laser drilling technique could be used. Piezoelectric materials which are candidate spatial filters are crystal quartz and barium titanate. Crystalline materials which have a center of symmetry cannot be piezoelectric, and the orientation of the electric field applied to the crystal is important in the converse piezoelectric effect. The latter is really the proper term, because in the variable spatial filter, an electric field is applied to induce a strain which enables the aperture hole to vary in diameter. In some crystals the effect is greatest when applied along a diad axis.

FIG. 7 illustrates the operation of the variable spatial frequency filter. A beam 87 from an objective lens or multiple holographic lens is focused at the center of the piezoelectric crystal 80 which has a voltage from a battery 85 or power supply applied thereto. A particular value of the voltage establishes a particular diameter for the hole 86. The outer rays 88 of the beam 87 from the objective lens represent the higher spatial frequencies from the objective lens which has the normal Fourier transforming properties of a lens. These rays are blocked as shown, and only those beams 89 below a frequency determined by the diameter of the aperture pass through the filter. The limit on the spatial frequency transmitted is determined as described above using the system constant S.

Changing the voltage from battery 85 sufficiently can enlarge the hole to permit frequencies which were previously blocked to be transmitted. Using the example given above, if the aperture is increased 13.6% in diameter, the new upper cut off frequency becomes 3.0 cycles/mm.

The ability to detect a target of interest within a given field of view depends upon the characteristics of other objects and the background features which are contained in the field. In terms of correlator performance, this ability is best expressed in terms of a signal-to-clutter ratio (S/C). The observed optical autocorrelation signal does not exist by itself in the output correlation plane. Cross correlation patterns arising from background objects are also present, and can obscure the desired autocorrelation signal. The S/C ratio is defined as the ratio of the autocorrelation peak signal to the average cross correlation signal.

Figure 9:
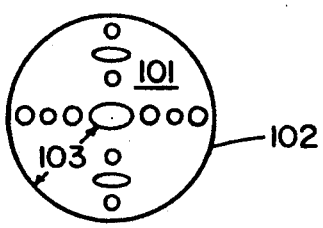
FIG. 9 illustrates a matched filter having a controlled spatial frequency pass band.

In an optical matched filter correlator, this ratio depends upon the spatial frequency pass band of the matched filter. In many applications, this pass band cannot be predetermined in order to maximize the S/C ratio. A method is needed to conveniently and rapidly vary the spatial frequency pass band to achieve an optimum S/C ratio. In a typical compound matched filter, the lower spatial frequencies are located near the optic axis center, while increased radial distance from the center is associated with higher frequencies. An applicable technique using this is shown in FIG. 9. A matched filter record 101, which is composed of a group of light and dark regions, is centered in a concentric circular aperture 102. Light incident upon the matched filter pattern, (in a direction normal to the page) at radial distances greater than the radius of the aperture 102 is blocked and would not contribute to the correlation plane output. Also, light incident upon the center portion of the matched filter pattern 101 is also blocked since the particular illustrated matched filter record is intentionally darkened in the center. Thus, the spatial frequency pass band is defined by the width of the annulus region 103.

Figure 10:
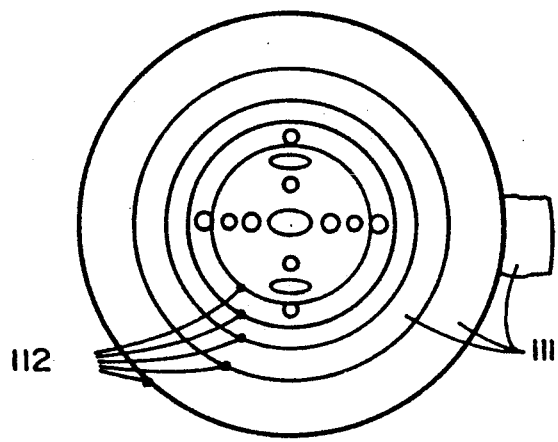
FIG. 10 is a schematic diagram of a matched filter on a liquid crystal having an array of concentric annular electrodes, such that its band pass characteristics can be controlled electrically.

The band pass characteristics of this setup can be varied by altering the width of the circular annulus 103. This control can be accomplished by a mechanical means to vary the aperture diameter (i.e. an iris diaphragm), or optically or thermally or by any suitable control. However, it is preferable to control the spatial frequency pass band region electrically, such as by the use of an array of concentric annuli composed of a material, the optical polarization properties of which can be controlled electrically, such as a liquid crystal, as shown in FIG. 10. Polarized laser light incident upon a particular group of concentric rings 111 would be blocked when the material in these rings is switched from an optically transmissive state to a blocking state upon the application of an appropriate electric voltage. The electrical connections 112 used to drive each individual ring in the annulus array can be made with radially oriented electrodes. Moreover, in alternative embodiments the matched filter band pass region need not be circular, or annular as illustrated. Other useful shapes could be used, and could be formed using an appropriate array of electrode structures.

In technical applications that use an array of matched filters for target recognition (to compensate for such changes as target orientation, size, etc.), the polarization properties of a programmable array can be used for a further processing task. When a number of matched filters are interrogated in parallel, for example by the Fourier transform array formed by a multiple holographic lens, the output from each matched filter contributes to the total output signal in the output correlation plane. With this configuration, one cannot determine which particular matched filter of the array yields the greatest correlation signal. However, with polarization control, the particular matched filter can be determined as follows. The polarization state of the material in the annulus structure covering each matched filter would be set to block the incident polarized laser beam for all but one matched filter location, and the correlation output from the transmissive matched filter is then measured. By selectively blocking all filters but one in sequence, the correlation output from each particular filter is measured in turn, and the individual output for each matched filter can be determined. In summary, electrical control of a matched filter spatial frequency pass band can greatly enhance and augment the uses of an optical correlator.

Figure 11:
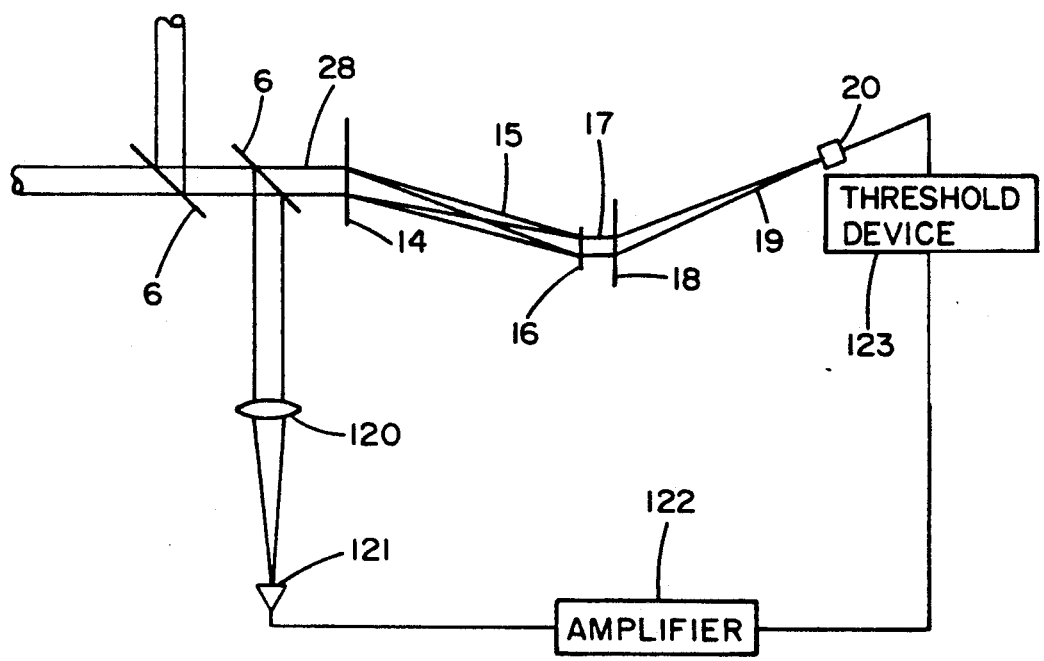
FIG. 11 illustrates a schematic arrangement for detecting an algebraic sum image, and for controlling a threshold signal in the correlation plane in accordance therewith.

FIG. 11 illustrates how the algebraic sum image 28 can be sampled and used to control a threshold signal in the correlation plane by adjusting the threshold level of the detector 20, which is generally set in proportion to the input image contrast. In FIG. 11, a lens 120 focuses sampled radiation onto a detector 121, such as a square law detector, the output of which is amplified at 122, to control an interface threshold device 123 for a detector 20, such as an imaging detector.

As an example, consider input images with the following characteristics:

|  | Hi Contrast Image | Med Contrast Image | Lo Contrast Image |
|---|---|---|---|
| $C_R$ | .89 | .87 | .55 |
| Transmission | .219 | .575 | .812 | where $C_R$ is the contrast ratio, and the transmission is an average over a large image aperture.

Figure 12:
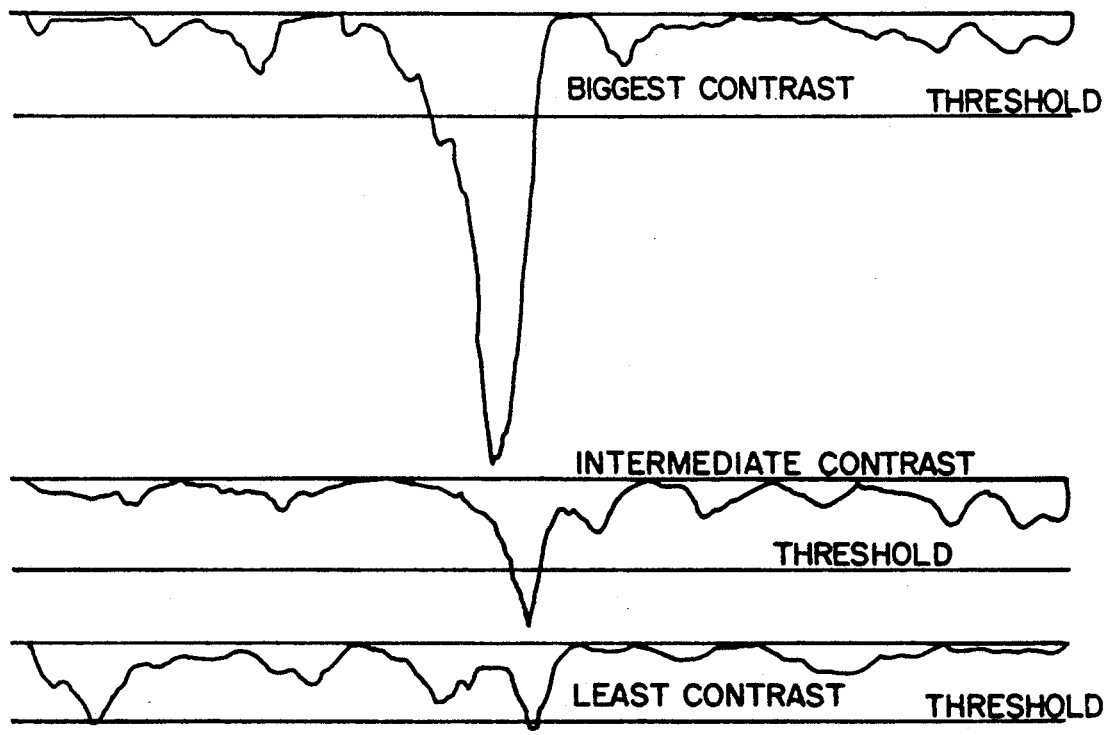
FIG. 12 illustrates several threshold signals obtained with different contrast images when the transmission is detected and used to establish the threshold signal level.

Consider the results when these three images are played through a high bandpass matched filter. When the input transmission level was used to establish the threshold in accordance with the measured transmissions, the c - plane scans passing through the observed correlation peaks shown in FIG. 12 were obtained.

The results show that with the illustrated and derived threshold, the higher contrast image yields clearly separable autocorrelation signals while the low contrast image includes one false alarm. The low contrast image in any case will have a poor signal to clutter ratio. The results demonstrate that the threshold setting increases the probability of detecting a target. However, if no target is present, a threshold would be set based on the percent transmission of the largest clutter, which is undesirable. To reference level based perhaps on the maximum transmission - lowest contrast ratio for which the S/C ratio is 1 in a test scene. If such a level is used, then one clutter signal would be eliminated in the low contrast image, correlation plane scan of FIG. 12, making the target signal more clearly identifiable. On the other hand, the reference level may bring the threshold above the target, thereby making detection impossible. This demonstrates that an image transmission proportional signal is desirable in order to increase the probability of detecting a target.

While several embodiments and variations of the present invention for an image enhanced optical correlation system are described in detail herein, it should be apparent that the disclosure and teachings of the present invention will suggest many alternative designs to those skilled in the art.

What is claimed is:

1. An image enhanced optical correlation system comprising:
    a. optical means for forming an input image beam which is modulated with an image of interest, and beam splitter means for splitting the image beam into first and second image beams, each having a different polarization component;
    b. a spatial light modulator for each of said first and second image beams for spatially modulating a coherent laser beam with the first or second image beam;
    c. a polarization rotator for at least one of the first and second image beams after it has been processed by the spatial light modulator to adjust the relative polarizations of the first and second image beams to be coplanar;
    d. an optical recombiner means for recombining the first and second coplanar polarizer image beams to form a recombined beam;
    e. a Fourier transform lens having the recombined beam directed thereon to a form Fourier transform image of the recombined beam;
    f. a matched filter having the Fourier transform output of said lens directed thereon;
    g. an inverse transform lens having the output of said matched filter incident thereon; and
    h. a photodetector means for detecting the output of said inverse transform lens in the correlation output plane of the optical correlator.

2. An image enhanced optical correlation system as claimed in claim 1, said Fourier transform lens comprising a multiple holographic lens for forming multiple replicated images of the recombined beam, and said matched filter comprising a multiple matched filter having the multiple replicated images of said multiple holographic lens directed thereon.

3. An image enhanced optical correlation system as claimed in claim 1, further including a driven phase modulator having the first image beam incident thereon for adjusting the phase of the first image beam relative to the phase of the second image beam.

4. An image enhanced optical correlation system as claimed in claim 1, further including a spatial filter having said recombined beam incident thereon for spatially filtering the recombined beam before it is directed onto said Fourier transform lens.

5. An image enhanced optical correlation system as claimed in claim 4, said spatial filter being electrically controlled to control the spatial filtering characteristics thereof.

6. An image enhanced optical correlation system as claimed in claim 5, said electrically controlled spatial filter comprising a piezoelectric element, the dimensions of which are electrically controlled.

7. An image enhanced optical correlation system as claimed in claim 1, further comprising an active laser source for providing the spatial light modulator with the coherent laser beam incident thereon, on which the image beam is superimposed by the spatial light modulator, and the output of said active laser source being directed onto a polarization controller, controlled by said photo detector means in the output plane of the optical correlator, before being directed to said spatial light modulator.

8. An image enhanced optical correlation system as claimed in claim 1, said matched filter being electrically controlled to control the spatial filtering characteristics thereof.

9. An image enhanced optical correlation system as claimed in claim 8, said compound matched filter comprising a matched filter on a liquid crystal having the filtering characteristics of different areas thereon controlled by different filter electrical control signals.

10. An image enhanced optical correlation system as claimed in claim 9, said different areas of the matched filter comprising concentric annular rings.

11. An image enhanced optical correlation system as claimed in claim 1, further including means for detecting the level of or input image contrast of the recombined beam, and a threshold circuit for controlling a threshold signal in the correlation plane by adjusting the threshold level of said photodetector means.

* * * * *

UNITED STATES PATENT AND TRADEMARK OFFICE
CERTIFICATE OF CORRECTION

PATENT NO. : 5,107,351
DATED : April 21, 1992
INVENTOR(S) : Kenneth G. Leib, et al.

It is certified that error appears in the above-identified patent and that said Letters Patent is hereby corrected as shown below:

Column 5, line 16: "images in" should read as --images 10 in--

Column 9, line 16: "c - plane" should read as --$\hat{c}$ - plane--

Column 9, line 27: "To reference" should read as --To avoid this problem, there is a need to establish a fixed reference--

Signed and Sealed this

Seventh Day of September, 1993

Attest:

BRUCE LEHMAN

*Attesting Officer*    *Commissioner of Patents and Trademarks*